US011976340B2

(12) United States Patent
Hosohara et al.

(10) Patent No.: US 11,976,340 B2
(45) Date of Patent: May 7, 2024

(54) REFINING VESSEL FOR HIGH-TEMPERATURE MELT

(71) Applicant: JFE Steel Corporation, Tokyo (JP)

(72) Inventors: Seiji Hosohara, Tokyo (JP); Atsushi Torigoe, Tokyo (JP); Ryoma Fujiyoshi, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 298 days.

(21) Appl. No.: 17/601,681

(22) PCT Filed: Mar. 24, 2020

(86) PCT No.: PCT/JP2020/013057

§ 371 (c)(1),
(2) Date: Oct. 5, 2021

(87) PCT Pub. No.: WO2020/203471

PCT Pub. Date: Oct. 8, 2020

(65) Prior Publication Data

US 2022/0170123 A1 Jun. 2, 2022

(30) Foreign Application Priority Data

Apr. 5, 2019 (JP) ................................ 2019-073097

(51) Int. Cl.
*C21C 5/48* (2006.01)
*F27D 3/16* (2006.01)

(52) U.S. Cl.
CPC .................. *C21C 5/48* (2013.01); *F27D 3/16* (2013.01); *F27D 2003/164* (2013.01); *F27D 2003/165* (2013.01)

(58) Field of Classification Search
CPC ....... C21C 5/48; F27D 3/16; F27D 2003/167; F27D 2027/002; F27D 2003/165; F27D 1/0006; F27D 2003/164; F27B 3/22
(Continued)

(56) References Cited

U.S. PATENT DOCUMENTS 4,306,030 A 12/1981 Watanabe et al.
4,431,745 A * 2/1984 Watanabe ............ C04B 35/013 501/109
(Continued)

FOREIGN PATENT DOCUMENTS

CN 203602649 U 5/2014
CN 107429303 A 12/2017
(Continued)

OTHER PUBLICATIONS

Second Office Action dated Oct. 17, 2022, of counterpart Chinese Patent Application No. 202080026868.2, along with a Concise Statement of Relevance of Office Action in English.
(Continued)

*Primary Examiner* — Jessee R Roe
*Assistant Examiner* — Michael Aboagye
(74) *Attorney, Agent, or Firm* — DLA Piper LLP (US)

(57) ABSTRACT

A refining vessel for high-temperature melt includes a refractory for gas blowing nozzle that includes a central refractory embedded with metal tubules, and an outer refractory circumferentially surrounding the central refractory. The refractory for gas blowing nozzle has a horizontal projection on which a minimum radius of an imaginary circle encompassing all the metal tubules embedded in the central refractory is R (mm), wherein the central refractory has an outline that falls between one circle that is concentric with the imaginary circle and has a radius of R+10 mm, and another circle that is concentric with the imaginary circle and has a radius of R+150 mm. The central refractory is formed of a MgO—C refractory having a carbon content of 30 to 80 mass %, and the outer refractory is formed of a MgO—C refractory having a carbon content of 10 to 25 mass %.

13 Claims, 1 Drawing Sheet

(58) Field of Classification Search
USPC .......... 266/47, 225, 265, 268, 218; 501/101, 501/104, 108, 138
See application file for complete search history.

(56) References Cited

U.S. PATENT DOCUMENTS

| | | | | |
|---|---|---|---|---|
| 4,735,400 | A | 4/1988 | Tate et al. | |
| 5,171,511 | A * | 12/1992 | Sharma | C21C 5/5217 266/224 |
| 6,464,932 | B1 * | 10/2002 | Nomura | C04B 35/013 266/286 |
| 8,093,169 | B2 | 1/2012 | Tanaka et al. | |
| 11,821,691 | B2 * | 11/2023 | Hosohara | C04B 35/013 |
| 2015/0353426 | A1 * | 12/2015 | Tanaka | C04B 35/013 501/87 |
| 2022/0003500 | A1 * | 1/2022 | Hosohara | B32B 18/00 |

FOREIGN PATENT DOCUMENTS

| | | | |
|---|---|---|---|
| CN | 207347178 | U | 5/2018 |
| EP | 3 279 340 | A1 | 2/2018 |
| JP | 58-15072 | A | 1/1983 |
| JP | 59-31810 | A | 2/1984 |
| JP | 63-24008 | A | 2/1988 |
| JP | H06-220517 | A | 8/1994 |
| JP | 2000-212634 | A | 8/2000 |
| JP | 3201678 | B2 | 8/2001 |
| JP | 2003-231912 | A | 8/2003 |
| JP | 2003-261374 | A | 9/2003 |
| JP | 2011-26643 | A | 2/2011 |
| JP | 2016-199788 | A | 12/2016 |
| JP | 2017-155256 | A | 9/2017 |
| JP | 2012-225568 | A | 11/2020 |
| JP | 6974115 | B2 | 12/2021 |
| KR | 10-1680234 | B1 | 12/2016 |
| TW | 201130989 | A | 9/2011 |
| WO | 2020/059801 | A1 | 3/2020 |

OTHER PUBLICATIONS

Extended European Search Report dated Apr. 5, 2022, of counterpart European Patent Application No. 20782076.2.

Office Action dated Oct. 31, 2022, of counterpart Korean Patent Application No. 10-2021-7031357, along with a Concise Statement of Relevance of Office Action in English.

Office Action dated Oct. 21, 2020, of counterpart Taiwanese Patent Application No. 109110039, along with a Concise Explanation of Relevance in English.

Office Action dated Jan. 28, 2023, of counterpart Chinese Patent Application No. 202080026868.2, along with a Concise Statement of Relevance of Office Action in English.

Communication Under Rule 71(3) EPC dated Jan. 9, 2023, of counterpart European Patent Application No. 20 782 076.2.

First Office Action dated May 11, 2022, of counterpart Chinese Patent Application No. 202080026868.2, along with an English translation.

Notice for Reasons for Refusal dated May 10, 2022, of counterpart Japanese Patent Application No. 2021-511500, along with an English translation.

Official Action dated Jan. 12, 2023, of related U.S. Appl. No. 17/277,149.

* cited by examiner

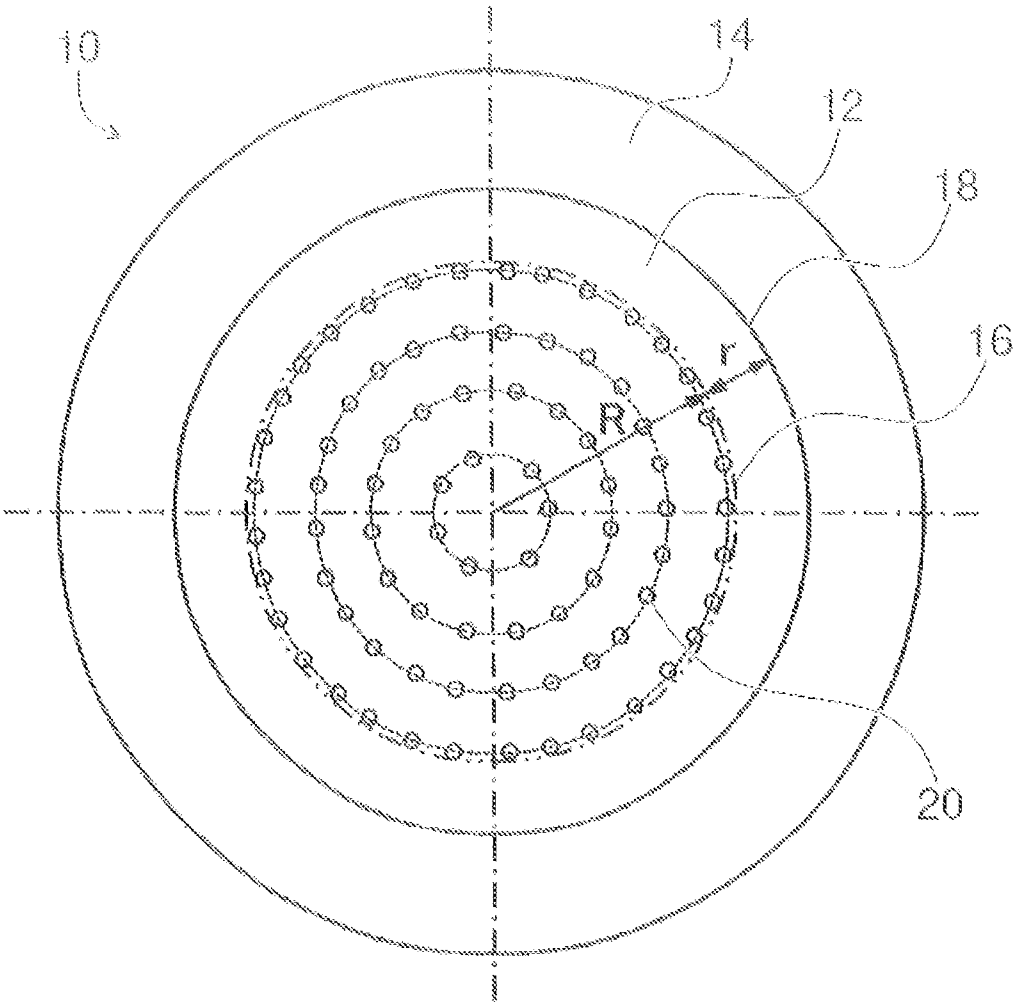
10
14
12
18
16
r
R
20

REFINING VESSEL FOR HIGH-TEMPERATURE MELT

TECHNICAL FIELD

This disclosure relates to converters, electric furnaces, and other such vessels for refining a high-temperature melt, specifically, a refining vessel for high-temperature melt equipped with a gas blowing nozzle at the bottom of furnace.

BACKGROUND

Converters and electric furnaces involve bottom blowing, a process by which a stirring gas (usually an inert gas such as nitrogen or argon) and a refining gas are blown into molten metal through the bottom of furnace to improve refining efficiency and alloy yield. For example, the following methods (1) to (3) are available for bottom blowing.

(1) A double pipe method by which oxygen is blown through an inner pipe for a decarburization purpose, whereas hydrocarbon gas (such as propane) is blown through an outer pipe to cool areas that comes into contact with the molten steel.

(2) A method that blows inert gas through a slit-like opening provided in a gap between a metal pipe and a brick (slit method).

(3) A method that uses a plurality of metal tubules (several to several hundreds) embedded in a carbon-containing brick, and blows inert gas through the metal tubules by supplying it into the metal tubules from the bottom of the brick via a gas introduction pipe and a gas reservoir.

Typically, methods (1) and (2) use a tuyere brick made in advance using an ordinary method, and it is common method that a part of the brick is worked for installation of double pipes or a metal pipe to be provided with a slit, or dividing a tuyere brick into two or four portions to provide a space for installing a metal pipe. For installation, tuyere bricks are placed around a previously set metal pipe used to blow gas.

Method (3) uses a gas blowing plug (nozzle) called a multiple-hole plug ("MHP"). For example, JP S59-31810 A teaches that an MHP can control a gas flow rate in a 0.01 to 0.20 $Nm^3$/min·t range. This makes an MHP more easily applicable than the double pipe method and the slit method.

An MHP is structured to include a plurality of metal tubules connected to a gas reservoir and embedded in a carbon-containing refractory such as a magnesia-carbon brick. Because of that construction, an MHP is produced by using methods different from methods used to make nozzles used by the double pipe method and the slit method.

Specifically, a raw material prepared from an aggregate such as raw material magnesia with addition of a carbon source (e.g., flake graphite), pitch, metallic species, and a binder such as phenolic resin is kneaded using a highly dispersive kneading means such as a high-speed mixer to obtain a kneaded material to be used to make a carbon-containing refractory to be embedded with metal tubules.

For production of an MHP, for example, metal tubules are embedded in a laminar fashion while being laid on the kneaded material, followed by molding under a predetermined pressure using a pressing machine, before a predetermined heat treatment such as drying and firing (the metal tubules are welded to a gas reservoir member after production). Alternatively, metal tubules are welded to a gas reservoir member in advance, and the kneaded material, filling the surrounding area, is molded under a predetermined pressure using a pressing machine before predetermined drying.

The bottom blowing nozzle experiences larger amount of damage (wear) than refractory such as furnace wall and, because it is an important member that determines the lifetime of furnace, various proposals have been made to reduce damage. For MHPs, the following improvements have been proposed, for example.

JP S63-24008 A discloses an MHP with a gas blowing nozzle portion integral with the surrounding tuyere, and that such an MHP can have less early erosion and wear from joint portions. However, that technique has only limited effects, and fails to provide an effective measure.

The following proposals have been made as countermeasures against a depression of melting point due to carburization of metal tubules embedded in a refractory (early damage of metal tubules).

JP 2000-212634 A discloses forming an oxide layer on surfaces of metal tubules by thermal spraying to reduce carburization of stainless-steel metal tubules embedded in a carbon-containing refractory such as magnesia-carbon. A problem with that technique, however, is that the oxide layer, because of insufficient thickness, provides only a small carburization reducing effect in refining furnaces intended for long-term use (for example, 2 to 6 months) such as in converters.

JP 2003-231912 A discloses installing a refractory sintered body between metal tubules and a carbon-containing refractory to reduce carburization of metal tubules. While that technique can provide a carburization reducing effect, a practical application is difficult to achieve because the distance between metal tubules is too narrow to allow easy installation of a refractory sintered body in a nozzle embedded with large numbers of metal tubules.

Other techniques employ a method whereby a carbon-containing refractory is impregnated with an organic material after reduction firing.

JP S58-15072 A discloses a process that heats a magnesia-carbon brick with an added metal Al powder by firing it at 500 to 1,000° C., and impregnating brick holes with an organic material having a carbonization yield of 25% or more. JP S58-15072 A states that this improves the hot strength of the magnesia-carbon brick while improving corrosion resistance at the same time. Japanese Patent Number: 3201678 discloses reduction firing of a magnesia-carbon brick at 600 to 1,500° C. after addition of 0.5 to 10 weight % of calcined anthracite to reduce the elastic modulus of the magnesia-carbon brick. It states that thermal spalling resistance can improve with that technique. Japanese Patent Number: 3201678 also describes optionally impregnating tar after firing. It states that impregnation of tar ensures sealing of holes, increases strength, and improves slaking resistance. However, those techniques produce only limited effects, and fail to provide effective measures.

As discussed above, gas blowing nozzles (such as MHPs) of a type using a metal tubule-embedded carbon-containing refractory have been studied with regard to refractory material and structure to achieve high durability. However, previous improvements remain unsatisfactory. It could therefore be helpful to provide a refining vessel for high-temperature melt equipped with a gas blowing nozzle that, while being highly durable, has at least one gas-blowing metal tubule embedded in a carbon-containing refractory.

SUMMARY

We thus provide:

[1] A refining vessel for high-temperature melt comprising a gas blowing nozzle configured from a refractory for gas blowing nozzle with at least one gas-blowing metal tubule embedded in a carbon-containing refractory, the refractory for gas blowing nozzle including a central refractory embedded with the at least one metal tubule, and an outer refractory circumferentially surrounding the central refractory, the refractory for gas blowing nozzle having a horizontal projection in which a minimum radius of an imaginary circle encompassing all the metal tubules embedded in the central refractory is R (mm), wherein the central refractory has an outline that falls between one circle that is concentric with the imaginary circle and has a radius of R+10 mm, and another circle that is concentric with the imaginary circle and has a radius of R+150 mm, wherein, the central refractory being formed of a MgO—C refractory having a carbon content of 30 to 80 mass %, and the outer refractory being formed of a MgO—C refractory having a carbon content of 10 to 25 mass %.

[2] The refining vessel for high-temperature melt according to [1], wherein the central refractory has an outline that falls between one circle concentric with the imaginary circle and having a radius of R+40 mm, and another circle concentric with the imaginary circle and having a radius of R+70 mm.

[3] The refining vessel for high-temperature melt according to [1] or [2], wherein the central refractory has a circular outline concentric with the imaginary circle.

[4] The refining vessel for high-temperature melt according to any one of [1] to [3], wherein the central refractory is formed of a MgO—C refractory having a carbon content of 50 to 70 mass %, and the outer refractory is formed of a MgO—C refractory having a carbon content of 15 to 25 mass %.

[5] The refining vessel for high-temperature melt according to any one of [1] to [4], wherein the central refractory contains less than 3.0 mass % of at least one of metal aluminum, metal silicon, Al—Mg, SiC, and $B_4C$.

[6] The refining vessel for high-temperature melt according to any one of [1] to [5], wherein the outer refractory has an outline that falls between one circle concentric with the imaginary circle and having a radius of R×2, and another circle concentric with the imaginary circle and having a radius of R×8.

[7] The refining vessel for high-temperature melt according to any one of [1] to [6], wherein the refining vessel comprises the gas blowing nozzle at a furnace bottom portion.

Our refining vessel for high-temperature melt is highly durable because cracking of gas blowing nozzle due to thermal shock is reduced. This enables the refining vessel to have an extended lifetime.

BRIEF DESCRIPTION OF THE DRAWING

The FIGURE is a plan view representing an example of a refractory 10 for gas blowing nozzle, showing the refractory 10 constituting a gas blowing nozzle of our refining vessel.

REFERENCE SIGNS LIST

10 Refractory for gas blowing nozzle
12 Central refractory
14 Outer refractory
16 Imaginary circle
18 Circle
20 Metal tubules

DETAILED DESCRIPTION

Because metal tubules eject a stream of gas, erosion and wear due to a flow of molten steel in the vicinity of the operating surface of nozzle have been considered as the primary cause of damage in MHPs used in converters and electric furnaces. The measures taken in JP S63-24008 A are based on this idea. Others point out the possibility of carburization or other factors causing increased damage as a result of metal tubules wearing out before the operating surface. The techniques of JP 2000-212634 A and JP 2003-231912 A use this idea to prevent carburization of metal tubules. Another theory is that, because the refractory is cooled by a stream of inert gas during blowing, the temperature difference of when the gas is blown and not blown might cause spalling damage. Others speculate that damage may occur as a result of cracking in the operating surface occurring when the temperature reaches near 600° C., around which the carbon-containing refractory becomes the weakest. There are other theories but all are inconclusive. Accordingly, no effective measures have been taken, and the level of durability currently achievable is not necessarily satisfactory, as discussed above.

To investigate the actual cause of damage in MHPs, we collected products (MHPs) actually used in real furnaces, and closely examined the microstructure of the refractory in the vicinity of the operating surface of the nozzle. The investigation revealed that considerably large temperature changes in a 500 to 600° C. range had occurred in the refractory at a depth of about 10 to 20 mm from operating surface, and cracks, parallel to the operating surface, were observed in these portions. From the results of close examinations in the vicinity of the operating surface of the products actually used in real furnaces, we concluded that the form of damage in MHPs is caused not by erosion or wear but primarily by thermal shock due to an abrupt temperature gradient that occurs in the vicinity of the operating surface.

Following this finding, we conducted further detailed investigations with regard to material improvement that reduces the thermal stress that generates in a refractory for tuyeres, and found that a carbon-rich refractory having a high thermal conductivity (a high thermal conductivity makes the temperature gradient smaller) and a low coefficient of thermal expansion is effective to this end. However, increasing the carbon content tends to cause a severe decrease of wear resistance and erosion resistance, and the lifetime greatly decreases as a result of wear and erosion due to molten metal. After further studies, we found that this issue can be solved with a structure using a carbon-rich MgO—C material around metal tubules (a central portion with a predetermined area), where the refractory becomes the coolest, and by providing an ordinary-carbon-content MgO—C material around this area (at the outer portion).

Specifically, a refractory (MgO—C material) having an ordinary carbon content is used at the outer portion to reduce decrease of wear resistance and erosion resistance. Around the metal tubules, a carbon-rich refractory (MgO—C material) having a high thermal conductivity and a low coefficient of thermal expansion is used to reduce generation of cracks due to thermal shock. Because of high thermal conductivity, this refractory is cooled by the gas flowing in the metal tubules, and a slag or a solid film of metal (a mushroom as it is also called) is formed on the operating surface side. The solid film was found to block (protect) the refractory surface from molten steel, and provide the effect to reduce wear and erosive wear.

Hence, our refining vessel includes a gas blowing nozzle configured from a refractory 10 for gas blowing nozzle with at least one gas-blowing metal tubule 20 embedded in a carbon-containing refractory. The refractory 10 for gas blowing nozzle includes a central refractory 12 embedded with metal tubules 20, and an outer refractory 14 circumferentially surrounding the central refractory 12.

As discussed above, thermal shock is the primary cause of wear in MHP tuyeres. Because the peripheries of metal tubules 20 in an MHP tuyere are cooled by gas flowing in metal tubules 20, these portions of refractory experience a large thermal stress. Increasing the carbon content of MgO—C refractory is an effective way of reducing thermal shock and thermal stress. However, a MgO—C refractory having an increased carbon content more easily dissolves in molten steel, and wear resistance and erosion resistance decrease. Regarding this issue, we found that, because of high thermal conductivity, the peripheries of metal tubules 20 with an increased carbon content become cooled by gas flowing in metal tubules 20, and this forms a slag or a solid metal film (mushroom) on the operating surface side. The solid film was found to protect the refractory surface from molten steel, and provide an effect to reduce wear and erosive wear.

To this end, the refractory 10 for gas blowing nozzle constituting the gas blowing nozzle of the refining vessel is configured from the central refractory 12 embedded with metal tubules 20, and the outer refractory 14 circumferentially surrounding the central refractory 12, and the central refractory 12 is formed of a carbon-rich MgO—C refractory. The refractory forming the central refractory 12 and the outer refractory 14 is, for example, a brick.

The central refractory 12 formed of a carbon-rich MgO—C refractory needs to have a predetermined size (outline) to obtain the effect described above, as follows.

The FIGURE is a plan view representing an example of the refractory 10 for gas blowing nozzle, showing the refractory 10 constituting a gas blowing nozzle of a refining vessel. As shown in the FIGURE, the refractory 10 for gas blowing nozzle has a horizontal projection (operating plane) in which a minimum radius of an imaginary circle encompassing all the metal tubules 20 embedded in the central refractory 12 is R (mm) (in a plan view), wherein the central refractory 12 has an outline that falls between one circle that is concentric with the imaginary circle 16 and has a radius of R+10 mm, and another circle that is concentric with the imaginary circle 16 and has a radius of R+150 mm. That is, in the FIGURE, the central refractory 12 has an arbitrarily chosen outline that falls in a range with a radius R+r, where r is 10 mm or more and 150 mm or less. When the central refractory 12 has an outline with a radius of less than R+10 mm, the metal tubules 20 are too close to the boundary between the outer refractory 14 and the central refractory 12, and the metal tubules may experience deformation or other defects while molding the refractory. Accordingly, the central refractory 12 needs to have an outline that is at least as large as a circle having a radius of R+10 mm. Preferably, the central refractory 12 has an outline that is at least as large as a circle concentric with the imaginary circle 16 and having a radius of R+40 mm.

When the central refractory 12 has an outline larger than a circle that is concentric with the imaginary circle 16 and has a radius of R+150 mm, the operating surface of central refractory 12 has portions not covered with a mushroom, and damage occurs upon contact with molten steel. Accordingly, the central refractory 12 needs to have an outline that is no greater than a circle concentric with the imaginary circle 16 and having a radius of R+150 mm. Preferably, the central refractory 12 has an outline that is no greater than a circle concentric with the imaginary circle 16 and having a radius of R+70 mm. In the FIGURE, the central refractory 12 preferably has an arbitrarily chosen outline that falls in a range with a radius R+r, where r is 40 mm or more and 70 mm or less. Preferably, the central refractory 12 has an outline of a circle concentric with the imaginary circle 16. The plane of the refractory 10 for gas blowing nozzle also represents a plane perpendicular to the axis line of metal tubules 20.

The MgO—C refractory forming the central refractory 12 has a carbon content of 30 mass % or more and 80 mass % or less. The thermal shock resistance becomes insufficient when the carbon content of the MgO—C refractory forming the central refractory 12 is less than 30 mass %, whereas the central refractory 12 suffers from poor corrosion resistance against molten steel and lacks reliability when the carbon content exceeds 80 mass %. Accordingly, the carbon content of the MgO—C refractory forming the central refractory 12 needs to be 30 mass % or more and 80 mass % or less, preferably 50 mass % or more and 70 mass % or less.

The MgO—C refractory forming the outer refractory 14 has a carbon content of 10 mass % or more and 25 mass % or less. Damage due to thermal shock increases when the carbon content of the MgO—C refractory forming the outer refractory 14 is less than 10 mass %, whereas the outer refractory 14 suffers from poor wear resistance and erosion resistance and fails to provide satisfactory durability when the carbon content exceeds 25 mass %. Accordingly, the carbon content of the MgO—C refractory forming the outer refractory 14 needs to be 10 mass % or more and 25 mass % or less, preferably 15 mass % or more and 25 mass % or less.

Preferably, the outer refractory 14 has an arbitrarily chosen outline that falls between one circle that is concentric with the imaginary circle 16 and has a radius of R×2, and another circle that is concentric with the imaginary circle 16 and has a radius of R×8. With the outer refractory 14 having an outline at least as large as a circle that is concentric with the imaginary circle 16 and having a radius of R×2, it is possible to reduce decrease of wear resistance and erosion resistance of the refractory 10 for gas blowing nozzle. With the outer refractory 14 having an outline that is no greater than a circle concentric with the imaginary circle 16 and having a radius of R×8, it is possible to reduce decrease of thermal shock resistance of the refractory 10 for gas blowing nozzle. Because the outer refractory 14 is provided to circumferentially surround the central refractory 12, the metal tubules 20 are provided in the central refractory 12 while ensuring that the imaginary circle 16 has a radius R of greater than 10 mm.

The material of metal tubules 20 is preferably a metallic material having a melting point of 1,300° C. or more, though the material is not particularly limited. Examples of such metallic materials include metallic materials (metals or alloys) containing at least one of iron, chromium, cobalt, and nickel. Typical examples of metallic materials commonly used for metal tubules 20 include stainless steel (ferritic, martensitic, and austenitic), common steel, and heat-resistant steel. The metal tubules 20 have an inside diameter of preferably 1 mm or more and 4 mm or less. When the metal tubules 20 have an inside diameter of less than 1 mm, it may not be possible to smoothly supply gas in amounts sufficient to stir the molten metal in the furnace. With metal tubules 20 having an inside diameter of more than 4 mm, clogging may occur as a result of molten metal flowing into the metal tubules 20. The metal tubules 20 have a tube thickness of about 1 to 2 mm.

The number of metal tubules 20 embedded in the carbon-containing refractory is not particularly limited, and is appropriately selected according to the required flow rate of the blown gas, or the area of operating portion. In applications requiring high flow rate such as in converters, typically about 60 to 250 metal tubules 20 are embedded. On the other hand, typically one to about several tens of metal tubules 20 are embedded in applications where the blown gas has a low flow rate such as in electric furnaces and ladles.

The following describes a method of manufacturing a refractory for gas blowing nozzle forming a gas blowing nozzle provided in a refining vessel.

The raw materials of the carbon-containing refractory (central refractory 12, outer refractory 14) are primarily aggregates and carbon sources. However, the raw materials may additionally contain other materials and binders, for example.

The carbon-containing refractory may use aggregates such as magnesia, alumina, dolomite, zirconia, chromia, and spinel (alumina-magnesia, chromia-magnesia). From the viewpoint of corrosion resistance against molten metal and molten slag, the aggregate is primarily magnesia.

The carbon source of the carbon-containing refractory is not particularly limited and may be, for example, flake graphite, expandable graphite, amorphous graphite, calcined anthracite, petroleum pitch, or carbon black. The carbon source is added in amounts that depend on the carbon content of central refractory 12 and outer refractory 14.

Examples of additional materials other than the aggregates and carbon sources include metallic species such as metal aluminum, metal silicon, and Al—Mg alloys, and carbides such as SiC and $B_4C$. The raw material may contain at least one of these materials. Typically, the content of additional material is 3.0 mass % or less. These additional raw materials are added, for example, to reduce oxidation of carbon. However, because these materials are inferior to MgO and carbon in terms of erosion resistance, it is preferable to contain at least one of metal aluminum, metal silicon, Al—Mg, SiC, and $B_4C$ in an amount of less than 3.0 mass %. The content of additional raw material may be as small as 0 mass %.

The raw material of carbon-containing refractory typically contains a binder. The binder may be selected from those that can be commonly used as binders for shaped refractories such as phenolic resin and liquid pitch. Typically, the binder content is about 1 to 5 mass % (not included in the total).

The refractory 10 for gas blowing nozzle can be produced using known methods. The following describes non-limiting examples of such methods. First, raw materials of central refractory 12 are mixed, and kneaded into a kneaded product using a mixer. Separately, raw materials of outer refractory 14 are mixed and kneaded in the same fashion. Thereafter, the metal tubules 20 are disposed at predetermined positions in the kneaded product of central refractory 12, and the material is molded by uniaxial pressing to form a central refractory 12 embedded with the metal tubules 20. After filling the kneaded product of outer refractory 14 around the central refractory 12, the two materials are molded into one by cold isotropic pressing ("CIP") to form a base material that becomes the refractory 10 for gas blowing nozzle. The base material is then subjected to a predetermined heat treatment such as drying, using an ordinary method. Optionally, this may be followed by post-processes such as shaping.

Pressing of central refractory 12 may be achieved by a multistage pressure molding process whereby pressure is applied in a repeated cycle to a small amount of a kneaded product filled inside a mold frame, and then to a predetermined amount of a kneaded product filled in the mold after the metal tubules 20 are disposed at predetermined positions. Alternatively, the kneaded product may be molded altogether by applying pressure once with the metal tubules 20 held at the both ends so that translocation occurs with the movement of the kneaded product under applied pressure.

The metal tubules 20 may be joined to a gas reservoir unit after molding the central refractory 12 or after forming the base material, or after the heat treatment of the base material. Alternatively, the metal tubules 20 may be welded to the top plate of a gas reservoir unit in advance, and disposed in the kneaded product of central refractory 12 in molding the central refractory 12.

The method used to knead the raw materials of carbon-containing refractory is not particularly limited, and the raw materials may be kneaded by using means that are used to knead shaped refractories in equipment such as a high-speed mixer, a Tyre mixer (a Koner mixer), or an Einrich mixer.

Common pressing machines used to mold refractories can be used to mold kneaded products, including, for example, uniaxial molding machines such as a hydraulic press and a friction press, and CIP molding machines. The molded carbon-containing refractory may be dried at a drying temperature of 180° C. to 350° C. for about 5 to 30 hours.

The refractory 10 for gas blowing nozzle produced in the manner described above is attached to a refining vessel for high-temperature melt (such as a converter or an electric furnace) to form a gas blowing nozzle. Typically, the gas blowing nozzle is positioned at the bottom of furnace; however, the position of gas blowing nozzle is not limited to this. When the gas blowing nozzle is positioned at the bottom of furnace, the refractory 10 for gas blowing nozzle is attached as a bottom brick of furnace near the bottom blowing tuyere to form a gas blowing nozzle.

EXAMPLES

A refractory for gas blowing nozzle with concentrically disposed 81 metal tubules as shown in the FIGURE was prepared under the conditions shown in Tables 1 to 4.

The radius R+r of central refractory was varied within a range of the value r from 8 to 200 mm, where R, which represents the smallest radius of imaginary circle encompassing all the metal tubules 20 embedded in the central refractory, had a value of 50 mm on a horizontal projection of the refractory 10 for gas blowing nozzle.

A common steel or stainless steel (SUS304) having an outside diameter of 3.5 mm and an inside diameter of 2.0 mm was used as the metal tubules 20 embedded in the carbon-containing refractory.

The raw materials of refractory were mixed in the proportions shown in Tables 1 to 4, and kneaded with a mixer. With the metal tubules 20 disposed in a kneaded product of central refractory 12, the kneaded product was molded into a central refractory 12 by uniaxial pressing. The base material was formed of CIP molding after filling a kneaded product of outer refractory 14 around the central refractory 12. The base material was then dried into a refractory product using an ordinary method.

The refractory 10 for gas blowing nozzle produced in this fashion was used as a bottom brick of furnace near the bottom blowing tuyere of a 250-ton converter to form a gas blowing nozzle. This produced refining vessels of Examples and Comparative Examples. After 2,500 charges (ch), the wear rate (mm/ch) was determined from the remaining thickness of refractory, and the wear rate was used to determine the wear rate ratio (index) as a ratio relative to the wear rate, 1, of Comparative Example 1. The results are presented in Tables 1 to 4.

As shown in Tables 1 to 4, the refractories for gas blowing nozzle of the Examples had smaller wear rates than the refractories for gas blowing nozzle of Comparative Examples, showing excellent durability. Durability was particularly desirable in refractories of the Examples in which the gas blowing nozzles had a carbon content of 50 to 70 mass % for the MgO—C refractory of central refractory 12, and a carbon content of 15 to 25 mass % for the MgO—C refractory of outer refractory. The durability was even more desirable in refractories for gas blowing nozzle of the Examples in which the central refractory 12 had a radius of R+40 mm or more and R+70 mm or less.

TABLE 1

| Example No. | | 1 | 2 | 3 | 4 | 5 | 6 | 7 | 8 | 9 | 10 |
|---|---|---|---|---|---|---|---|---|---|---|---|
| Conditions for mixture of raw materials of central refractory (mass %) | MgO | 70 | 70 | 50 | 50 | 50 | 50 | 50 | 40 | 30 | 25 |
| | Dolomite | | | | | | | | | | 5 |
| | Spinel ($Al_2O_3$—MgO) | | | | | | | | 10 | | |
| | Flake graphite | 30 | 28 | 50 | 50 | 50 | 48 | 48 | 50 | 70 | 70 |
| | Expandable graphite | | 2 | | | | 2 | | | | |
| | Calcined anthracite | | | | | | | 2 | | | |
| | Phenolic resin *1 | 3 | 3 | 3 | 3 | 3 | 3 | 3 | 3 | 3 | 3 |
| Conditions for mixture of raw materials of outer refractory (mass %) | MgO | 80 | 80 | 80 | 80 | 80 | 80 | 80 | 80 | 80 | 80 |
| | Flake graphite | 20 | 20 | 20 | 20 | 20 | 20 | 20 | 20 | 20 | 20 |
| | Expandable graphite | | | | | | | | | | |
| | Phenolic resin *1 | 3 | 3 | 3 | 3 | 3 | 3 | 3 | 3 | 3 | 3 |
| Number of metal tubules | Material: Common steel | 81 | — | — | — | 81 | 81 | 81 | — | — | — |
| | Material: SUS304 | — | 81 | 126 | 168 | — | — | — | 81 | 126 | 168 |
| r (mm) | | 50 | 50 | 50 | 50 | 50 | 50 | 50 | 60 | 60 | 70 |
| Wear rate ratio (relative to Comparative Example 1) | | 0.73 | 0.71 | 0.63 | 0.61 | 0.65 | 0.64 | 0.66 | 0.65 | 0.63 | 0.67 |

*1 Mass %, not included in the total

TABLE 2

| Example No. | | 11 | 12 | 13 | 14 | 15 | 16 | 17 | 18 | 19 |
|---|---|---|---|---|---|---|---|---|---|---|
| Conditions for mixture of raw materials of central refractory (mass %) | MgO | 20 | 50 | 60 | 50 | 50 | 50 | 50 | 50 | 40 |
| | Dolomite | | | | | | | | | |
| | Spinel ($Al_2O_3$—MgO) | | | | | | | | | |
| | Flake graphite | 80 | 50 | 40 | 50 | 50 | 50 | 50 | 50 | 60 |
| | Expandable graphite | | | | | | | | | |
| | Calcined anthracite | | | | | | | | | |
| | Phenolic resin *1 | 3 | 3 | 3 | 3 | 3 | 3 | 3 | 3 | 3 |
| Conditions for mixture of raw materials of outer refractory (mass %) | MgO | 80 | 80 | 80 | 80 | 80 | 88 | 85 | 75 | 80 |
| | Flake graphite | 20 | 20 | 20 | 20 | 20 | 10 | 15 | 25 | 20 |
| | Expandable graphite | | | | | | 2 | | | |
| | Phenolic resin *1 | 3 | 3 | 3 | 3 | 3 | 3 | 3 | 3 | 3 |
| Number of metal tubules | Material: Common steel | — | — | — | — | — | — | — | — | — |
| | Material: SUS304 | 81 | 126 | 126 | 81 | 81 | 126 | 126 | 126 | 126 |
| r (mm) | | 40 | 10 | 10 | 100 | 150 | 10 | 10 | 10 | 40 |
| Wear rate ratio (relative to Comparative Example 1) | | 0.75 | 0.74 | 0.73 | 0.72 | 0.78 | 0.85 | 0.69 | 0.70 | 0.71 |

*1 Mass %, not included in the total

TABLE 3

| Comparative Example No. | | 1 | 2 | 3 | 4 | 5 | 6 | 7 | 8 |
|---|---|---|---|---|---|---|---|---|---|
| Conditions for mixture of raw materials of central refractory (mass %) | MgO | 80 | 80 | 75 | 10 | 10 | 80 | 10 | 80 |
| | Dolomite | | | | | | | | |
| | Spinel ($Al_2O_3$—MgO) | | | | | | | | |
| | Flake graphite | 20 | 20 | 20 | 85 | 90 | 20 | 85 | 20 |
| | Expandable graphite | | | 5 | | | | 5 | |
| | Calcined anthracite | | | | 5 | | | | |
| | Phenolic resin *1 | 3 | 3 | 3 | 3 | 3 | 3 | 3 | 3 |
| Conditions for mixture of raw materials of outer refractory (mass %) | MgO | 80 | 80 | 80 | 80 | 80 | 80 | 80 | 93 |
| | Flake graphite | 20 | 20 | 20 | 20 | 20 | 20 | 20 | 7 |
| | Expandable graphite | | | | | | | | |

TABLE 3-continued

| Comparative Example No. | | 1 | 2 | 3 | 4 | 5 | 6 | 7 | 8 |
|---|---|---|---|---|---|---|---|---|---|
| | Phenolic resin *1 | 3 | 3 | 3 | 3 | 3 | 3 | 3 | 3 |
| Number of metal tubules | Material: Common steel | 81 | — | — | — | 126 | 126 | 126 | — |
| | Material: SUS304 | — | 81 | 126 | 126 | — | — | — | 126 |
| r (mm) | | 50 | 50 | 50 | 8 | 8 | 180 | 200 | 50 |
| Wear rate ratio (relative to Comparative Example 1) | | 1.00 | 0.98 | 0.95 | 1.41 | 1.50 | 1.22 | 1.43 | 1.38 |

*1 Mass %, not included in the total

TABLE 4

| Comparative Example No. | | 9 | 10 | 11 | 12 | 13 | 14 | 15 |
|---|---|---|---|---|---|---|---|---|
| Conditions for mixture of raw materials of central refractory (mass %) | MgO | 80 | 80 | 50 | 50 | 50 | 10 | 50 |
| | Dolomite | | | | | | | |
| | Spinel ($Al_2O_3$—MgO) | | | | | | | |
| | Flake graphite | 20 | 20 | 50 | 50 | 50 | 90 | 50 |
| | Expandable graphite | | | | | | | |
| | Calcined anthracite | | | | | | | |
| | Phenolic resin *1 | 3 | 3 | 3 | 3 | 3 | 3 | 3 |
| Conditions for mixture of raw materials of outer refractory (mass %) | MgO | 91 | 65 | 70 | 70 | 70 | 70 | 95 |
| | Flake graphite | 7 | 35 | 30 | 30 | 30 | 30 | 5 |
| | Expandable graphite | 2 | | | | | | |
| | Phenolic resin *1 | 3 | 3 | 3 | 3 | 3 | 3 | 3 |
| Number of metal tubules | Material: Common steel | — | — | — | — | — | — | — |
| | Material: SUS304 | 126 | 126 | 126 | 126 | 126 | 126 | 126 |
| r (mm) | | 50 | 50 | 50 | 160 | 5 | 50 | 50 |
| Wear rate ratio (relative to Comparative Example 1) | | 1.25 | 1.18 | 0.90 | 1.07 | 1.06 | 1.40 | 1.27 |

*1 Mass %, not included in the total

The invention claimed is:

1. A refining vessel for high-temperature melt comprising a gas blowing nozzle configured from a refractory for gas blowing nozzle with one or more gas-blowing metal tubules embedded in a carbon-containing refractory, the refractory for gas blowing nozzle including a central refractory embedded with the one or more gas-blowing metal tubules, and an outer refractory circumferentially surrounding the central refractory, the refractory for gas blowing nozzle having an operating plane in which a minimum radius of an imaginary circle encompassing all the gas-blowing metal tubules embedded in the central refractory is R (mm), wherein the central refractory has an outline that falls between one circle that is concentric with the imaginary circle and has a radius of R+10 mm, and another circle that is concentric with the imaginary circle and has a radius of R+150 mm, the central refractory is formed of a MgO—C refractory having a carbon content of 30 to 80 mass %, and the outer refractory is formed of a MgO—C refractory having a carbon content of 10 to 25 mass %, wherein the outer refractory has an outline that falls between one circle concentric with the imaginary circle and having a radius of R×2, and another circle concentric with the imaginary circle and having a radius of R×8.

2. The refining vessel according to claim 1, wherein the central refractory has an outline that falls between one circle concentric with the imaginary circle and having a radius of R+40 mm, and another circle concentric with the imaginary circle and having a radius of R+70 mm.

3. The refining vessel according to claim 1, wherein the central refractory has a circular outline concentric with the imaginary circle.

4. The refining vessel according to claim 1, wherein the central refractory is formed of a MgO—C refractory having a carbon content of 50 to 70 mass %, and the outer refractory is formed of a MgO—C refractory having a carbon content of 15 to 25 mass %.

5. The refining vessel according to claim 1, wherein the refining vessel comprises the gas blowing nozzle at a furnace bottom portion.

6. The refining vessel according to claim 2, wherein the central refractory has a circular outline concentric with the imaginary circle.

7. The refining vessel according to claim 2, wherein the central refractory is formed of a MgO—C refractory having a carbon content of 50 to 70 mass %, and the outer refractory is formed of a MgO—C refractory having a carbon content of 15 to 25 mass %.

8. The refining vessel according to claim 3, wherein the central refractory is formed of a MgO—C refractory having a carbon content of 50 to 70 mass %, and the outer refractory is formed of a MgO—C refractory having a carbon content of 15 to 25 mass %.

9. The refining vessel according to claim 2, wherein the refining vessel comprises the gas blowing nozzle at a furnace bottom portion.

10. The refining vessel according to claim 3, wherein the refining vessel comprises the gas blowing nozzle at a furnace bottom portion.

11. The refining vessel according to claim 6, wherein the refining vessel comprises the gas blowing nozzle at a furnace bottom portion.

12. The refining vessel according to claim 7, wherein the refining vessel comprises the gas blowing nozzle at a furnace bottom portion.

13. The refining vessel according to claim 1, wherein the central refractory contains less than 3.0 mass % of at least one of metal aluminum, metal silicon, Al—Mg, SiC, and $B_4C$.

* * * * *